United States Patent Office 2,698,847
Patented Jan. 4, 1955

2,698,847

SUBSTITUTED PIPERAZINIUM DIHALIDES

John G. Erickson, Minneapolis, Minn., assignor to General Mills, Inc., a corporation of Delaware No Drawing. Application March 28, 1952,
Serial No. 279,253

5 Claims. (Cl. 260—268)

The present invention relates to substituted piperazinium dihalides having the following formula

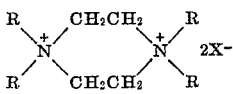

in which R is a fatty hydrocarbon group containing from 8 to 22 carbon atoms, and X is a halogen. These compounds react with bentonite to yield products which gel hydrocarbons. These hydrocarbon gels may be employed as lubricating greases.

It is therefore an object of the present invention to provide novel chemical compounds having the above formula.

It is another object of the present invention to provide a method of preparing these compounds.

These materials may be made from secondary fatty amines in accordance with the following reactions:

$$2R_2N + XCH_2CH_2X \longrightarrow R_2NCH_2CH_2NR_2 + 2HX$$

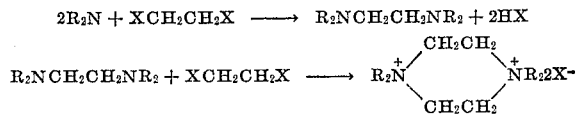

The secondary fatty amines employed in the reaction may be derived from fatty acids through the intermediate step of the formation of nitriles. In the preparation of the amines single isolated fatty acids may be employed or the fatty acids may be the mixed fatty acids from a fat or oil or any selected group thereof. Likewise they may be either saturated or unsaturated. It will be apparent, therefore, that the secondary amines employed in the present invention may contain the same or different aliphatic hydrocarbon groups. Accordingly the piperazinium compounds formed may likewise contain the same or different aliphatic hydrocarbon groups.

The preparation of tetraalkylethylenediamines, in which the alkyl groups are long chain groups, has been described by Frost, Chaberek and Martell, J. Am. Chem. Soc., 71, 3842 (1939).

The reaction of the ethylene dihalides with the tetraalkylethylenediamine is conveniently carried out merely by heating the reagents together. At 95° C. 40 hours or more may be required to obtain a desired degree of reaction. At higher temperatures less time is necessary. For example at 130°, 3 or 4 hours is satisfactory. Solvents are unnecessary, but may be employed if desired. Suitable solvents include ethers, alcohols and aromatic hydrocarbons.

Example 1

A mixture of 73.3 parts of the above tetradodecylethylenediamine, and 20 parts ethylene bromide was heated on a steam bath (95° C.) for 17 hours. The mixture was diluted with a low boiling hydrocarbon, cooled and filtered to yield 1,1,4,4-tetradodecylpiperazinium dibromide. After crystallization from a mixture of benzene and the low boiling hydrocarbon, the product melted at 217–220° C.

1,1,4,4-tetradodecylpiperazinium dibromide was dissolved in isopropyl alcohol. This solution was then added to an aqueous dispersion of bentonite containing about 1% by weight of solids. As the mixture was warmed on the steam bath, the milkiness of the dispersion disappeared and a flocculent precipitate appeared. This precipitate was filtered off, washed with water and isopropyl alcohol and dried. When stirred and warmed with toluene, it formed a grease-like gel.

Example 2

A mixture of 5.3 parts of tetraoctadecylethylenediamine and 0.70 part of ethylene chloride was heated to 95° C. for 66 hours. The mixture was then heated with a low boiling hydrocarbon, cooled and filtered to yield 1,1,4,4-tetraoctadecylpiperazinium dichloride. After crystallization from a mixture of chloroform and the low boiling hydrocarbon, the product melted at 177.5–179.5° C.

Example 3

A mixture of 10.9 parts of tetraoctadecylethylenediamine and 3 parts of ethylene bromide was heated for about 40 hours at 95° C. The product was then crystallized from ethyl acetate and extracted with a low boiling hydrocarbon to yield 1,1,4,4-tetraoctadecylpiperazinium dibromide.

While specific compounds have been described in the examples, other compounds in which the fatty groups contain from 8 to 22 carbon atoms may be prepared in the same manner by simply substituting a different starting material. The reaction proceeds in the same manner and the products have the same general properties.

I claim as my invention:

1. Compounds having the following formula

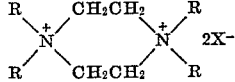

where the R groups are alkyl groups containing from 8 to 22 carbon atoms, and X is selected from the group consisting of chlorine and bromine.

2. Compounds having the following formula

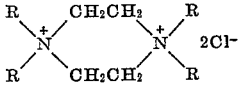

where the R groups are alkyl groups containing from 8 to 22 carbon atoms.

3. 1,1,4,4-tetradodecylpiperazinium dibromide.
4. 1,1,4,4-tetraoctadecylpiperazinium dichloride.
5. 1,1,4,4-tetraoctadecylpiperazinium dibromide.

References Cited in the file of this patent

FOREIGN PATENTS 695,217  Germany _____ Aug. 20, 1940

OTHER REFERENCES

Smith et al.: J. Am. Chem. Soc. 72, 2469–70 (1950).